US012767541B2

(12) United States Patent
Jeong et al.

(10) Patent No.: US 12,767,541 B2
(45) Date of Patent: Oct. 20, 2026

(54) REDUCED GRAPHENE OXIDE FOR SECONDARY BATTERY, PREPARATION METHOD THEREFOR, AND ELECTRODE AND SECONDARY BATTERY WHICH USE SAME

(71) Applicant: KOREA ELECTROTECHNOLOGY RESEARCH INSTITUTE, Gyeongsangnam-do (KR)

(72) Inventors: Seung Yol Jeong, Gyeongsangnam-do (KR); Sun Hye Yang, Gyeongsangnam-do (KR); Geon Woong Lee, Gyeongsangnam-do (KR); Ick Jun Kim, Busan (KR); Byeong Guk Kim, Busan (KR); Ji Hyeon Ryu, Gyeongsangnam-do (KR); Hye Jung Lee, Gyeongsangnam-do (KR); Soo Yeon Jeong, Gyeongsangnam-do (KR)

(73) Assignee: KOREA ELECTROTECHNOLOGY RESEARCH INSTITUTE, Gyeongsangnam-do (KR)

( * ) Notice: Subject to any disclaimer, the term of this patent is extended or adjusted under 35 U.S.C. 154(b) by 621 days.

(21) Appl. No.: 18/281,554

(22) PCT Filed: Nov. 5, 2021

(86) PCT No.: PCT/KR2021/016052

§ 371 (c)(1),
(2) Date: Sep. 11, 2023

(87) PCT Pub. No.: WO2023/080290

PCT Pub. Date: May 11, 2023

(65) Prior Publication Data

US 2024/0182310 A1 Jun. 6, 2024

(30) Foreign Application Priority Data

Nov. 2, 2021 (KR) ........................ 10-2021-0148421

(51) Int. Cl.
*C01B 32/198* (2017.01)
*C01B 32/225* (2017.01)
(Continued)

(52) U.S. Cl.
CPC .......... *C01B 32/198* (2017.08); *C01B 32/225* (2017.08); *C01B 32/23* (2017.08);
(Continued)

(58) Field of Classification Search
None
See application file for complete search history.

(56) References Cited

FOREIGN PATENT DOCUMENTS

CN 108987694 12/2018
KR 20120049679 A * 5/2012 ............ C01B 32/23
(Continued)

*Primary Examiner* — Basia A Ridley
*Assistant Examiner* — Heng M. Chan
(74) *Attorney, Agent, or Firm* — JCIPRNET

(57) ABSTRACT

The present disclosure relates to a reduced graphene oxide for a secondary battery, a method for preparing the same, an electrode using the same, and a secondary battery using the same. Specifically, the reduced graphene oxide is a powdery two-dimensional crystalline reduced graphene oxide satisfying Relational Expressions 1 to 3 shown below. [Relationship 1] $1 \leq T_Q \leq 5$ [relational expression 2] $100 \leq E_Q \leq 1{,}000$ [Relationship 3] $1 \leq BET_Q \leq 100$. In Relational Expression 1, $T_Q$ represents the thickness (nm) of the reduced graphene oxide. In Relational Expression 2, $E_Q$ represents the electrical conductivity (S/cm) of the reduced graphene oxide. In Relational Expression 3, $BET_Q$ represents the specific surface area ($m^2/g$) of the reduced graphene oxide.

8 Claims, 11 Drawing Sheets

(51) Int. Cl.
*C01B 32/23* (2017.01)
*H01M 4/587* (2010.01)

(52) U.S. Cl.
CPC ......... *H01M 4/587* (2013.01); *C01B 2204/04* (2013.01); *C01B 2204/22* (2013.01); *C01B 2204/32* (2013.01); *C01P 2002/84* (2013.01); *C01P 2002/88* (2013.01); *C01P 2004/04* (2013.01); *C01P 2004/61* (2013.01); *C01P 2006/12* (2013.01); *C01P 2006/40* (2013.01)

(56) References Cited

FOREIGN PATENT DOCUMENTS

| | | |
|---|---|---|
| KR | 1020120049679 | 5/2012 |
| KR | 1012974230000 | 8/2013 |
| KR | 1016501800000 | 8/2016 |
| KR | 1020170054941 | 5/2017 |
| KR | 1017996390000 | 11/2017 |
| KR | 1018463630000 | 5/2018 |
| KR | 1020180103086 | 9/2018 |

* cited by examiner

[FIG. 1]
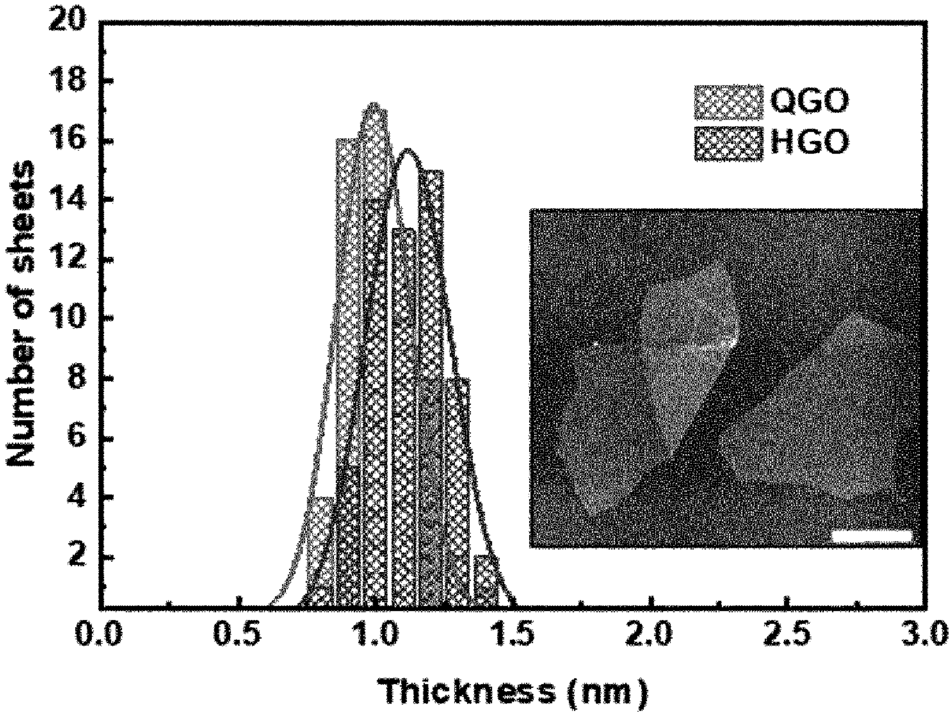
[FIG. 2]
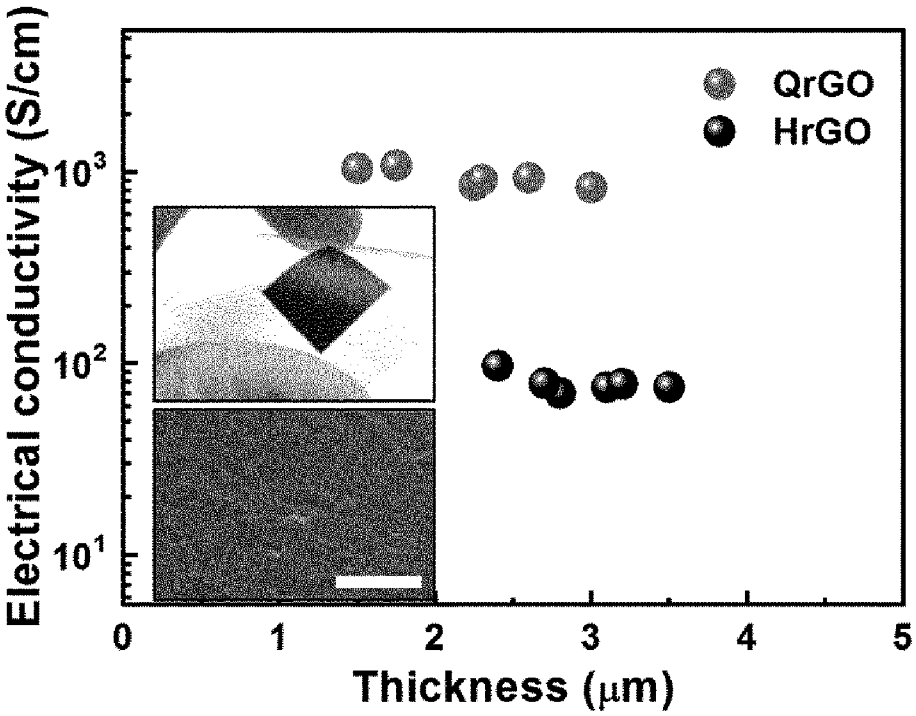

[FIG. 3a]
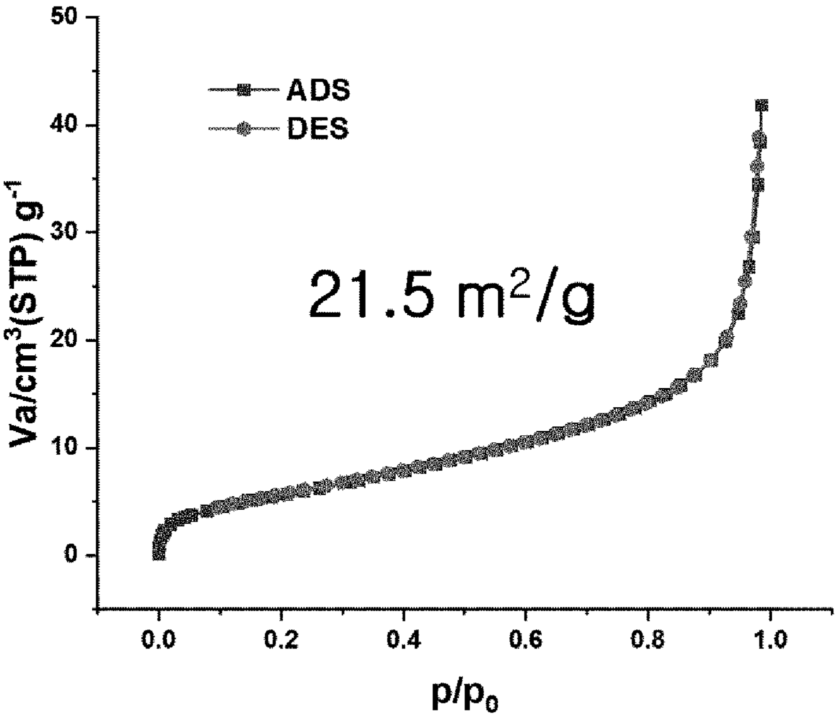
[FIG. 3b]
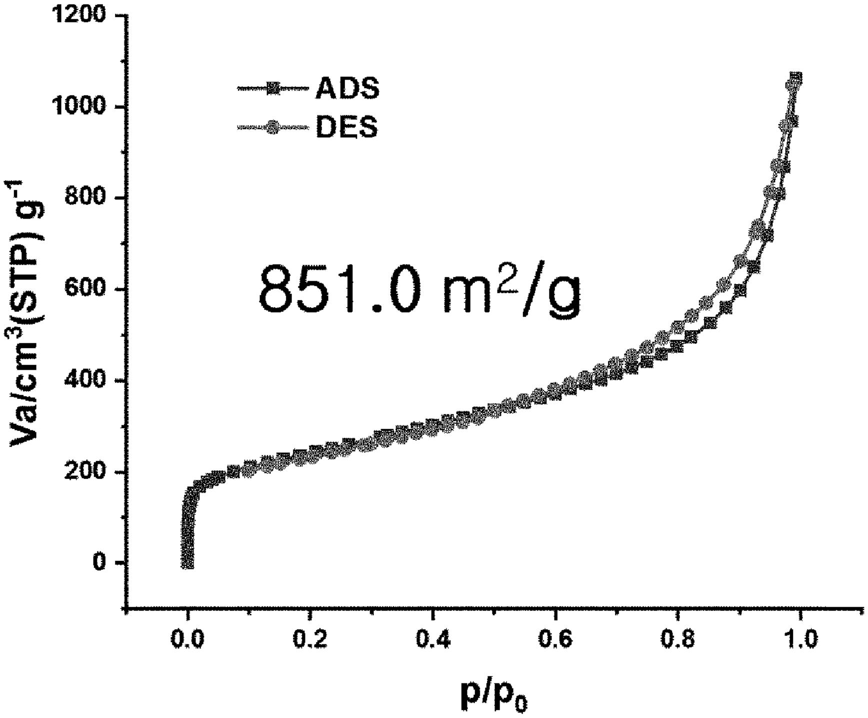

[FIG. 4]
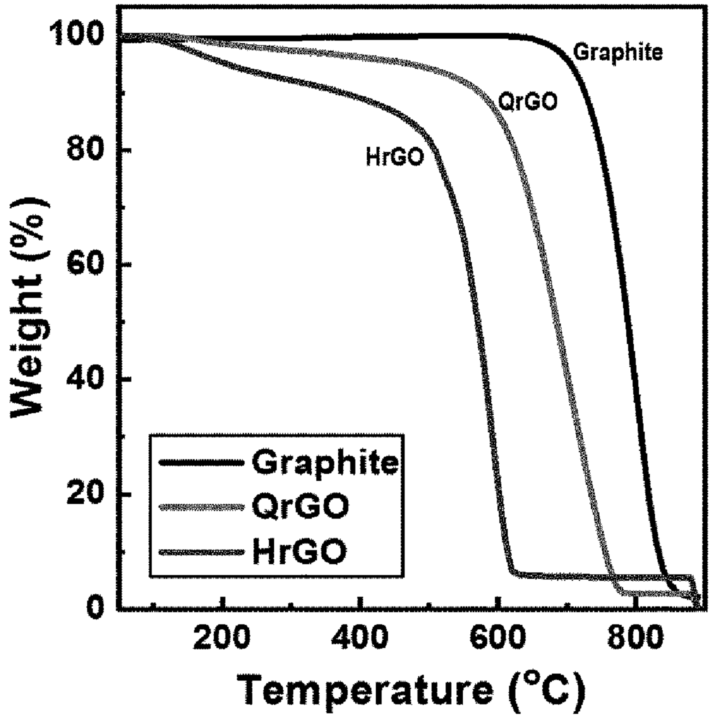
[FIG. 5a]
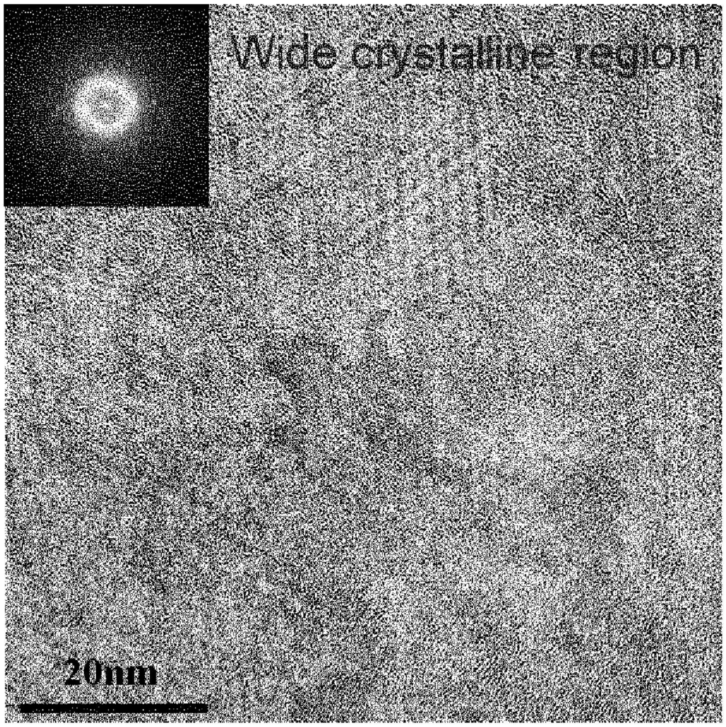

[FIG. 5b]
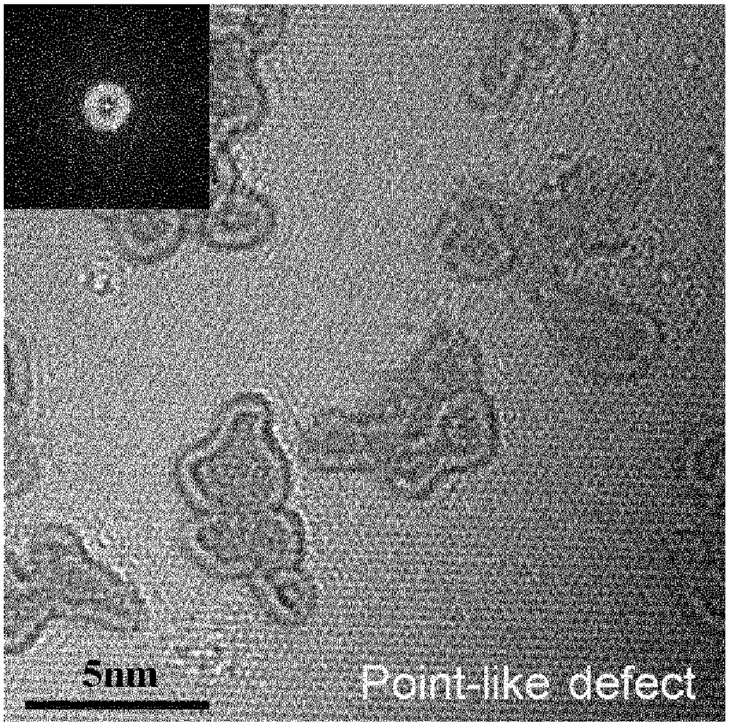
[FIG. 5c]
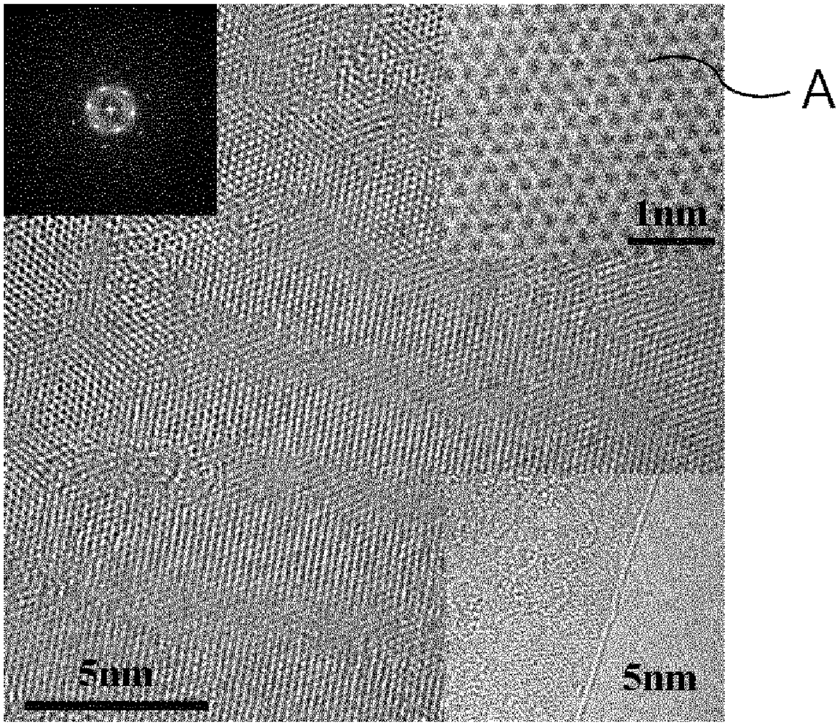

[FIG. 5d]
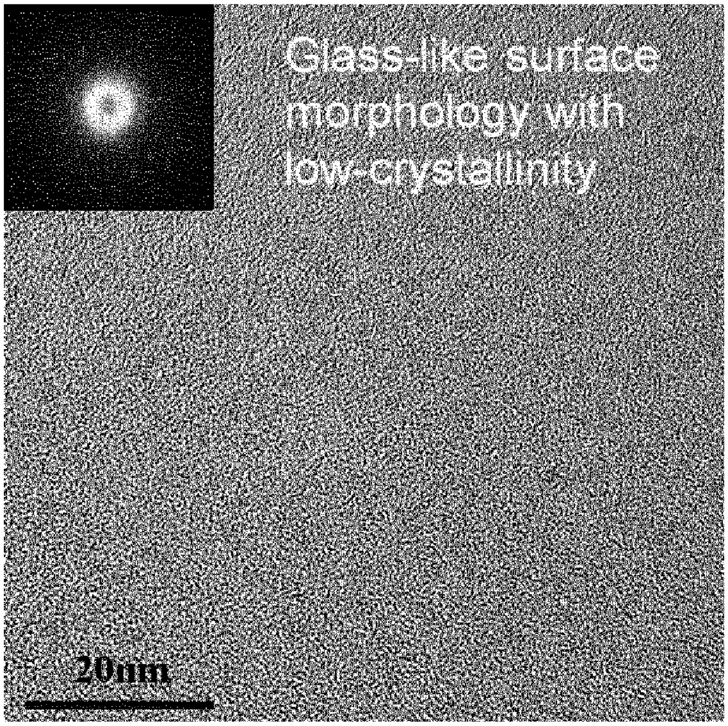
[FIG. 5e]
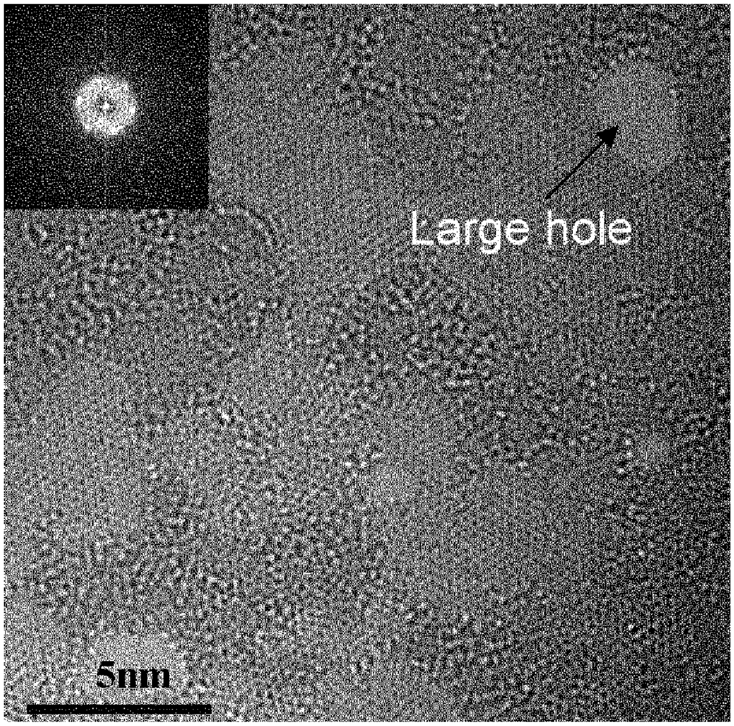

[FIG. 5f]
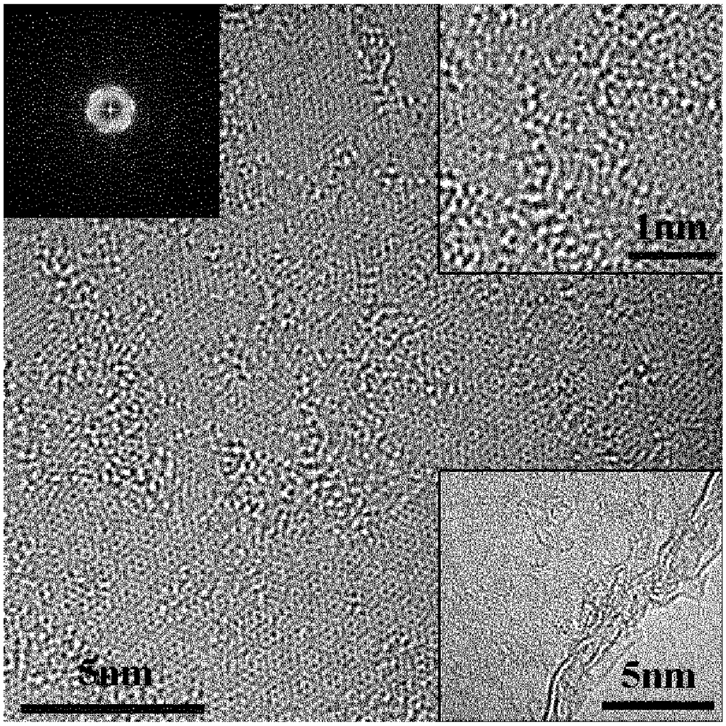
[FIG. 6]
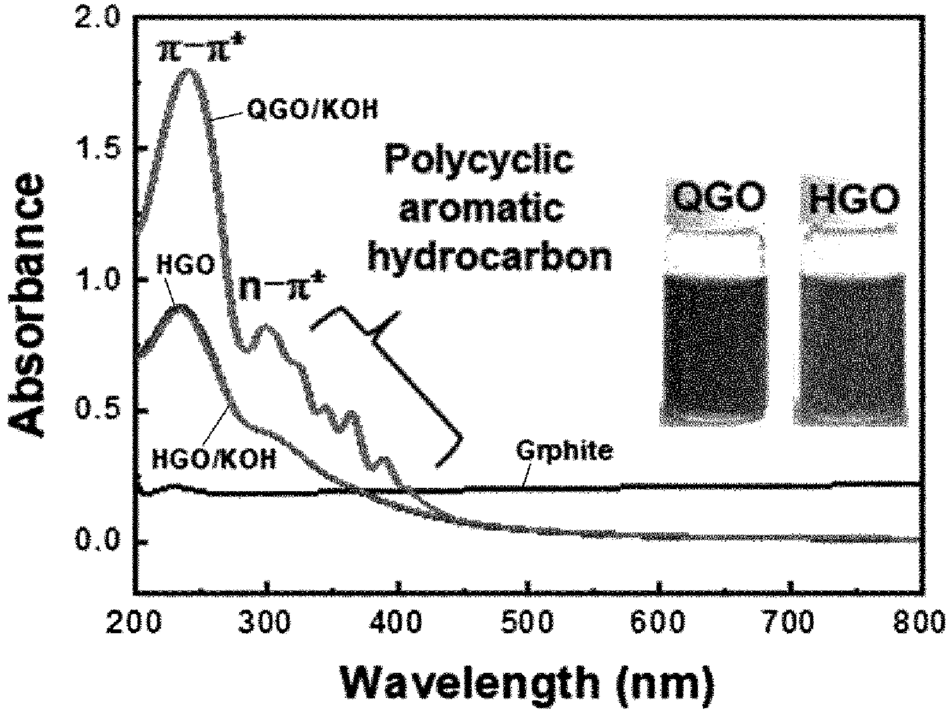

[FIG. 7a]
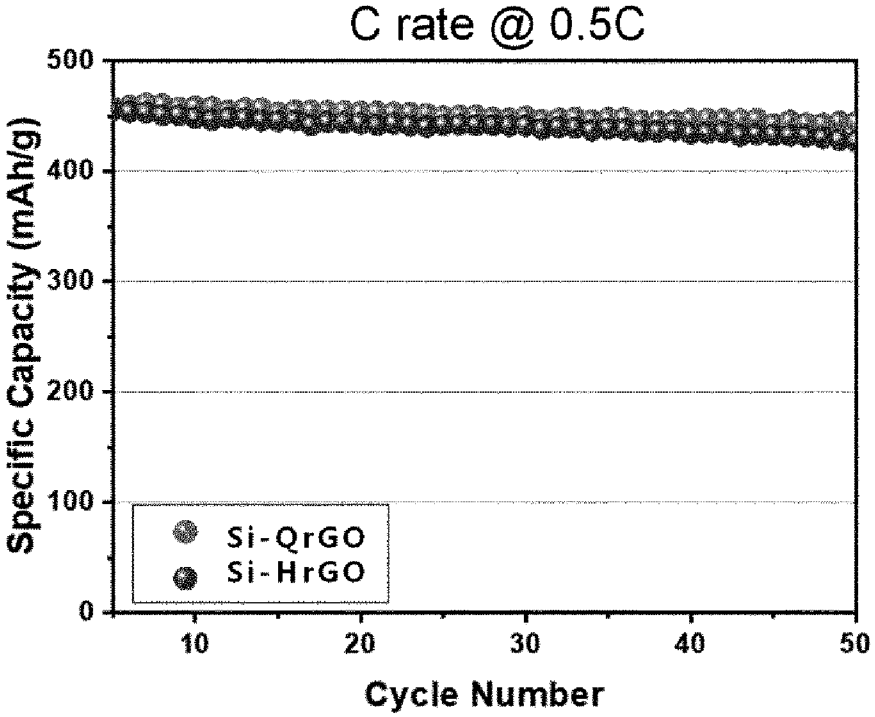
[FIG. 7b]
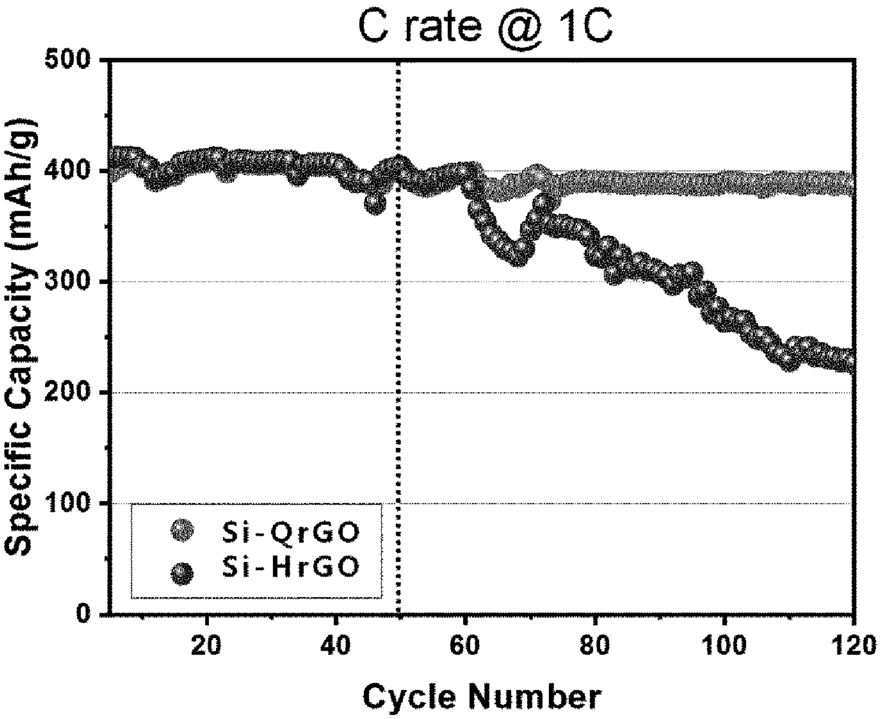

[FIG. 8]
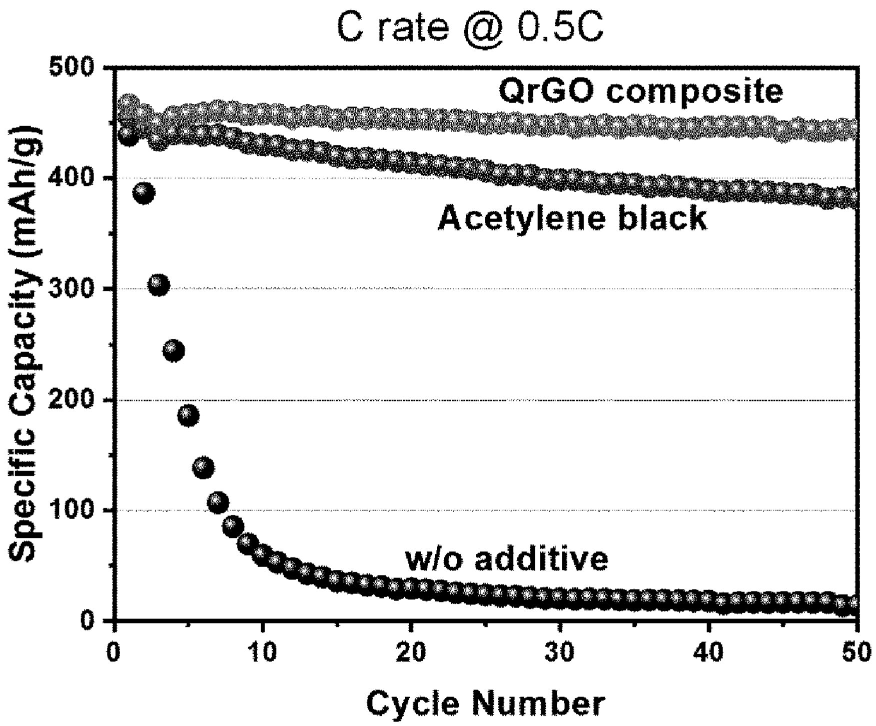
[FIG. 9]

[FIG. 10a]
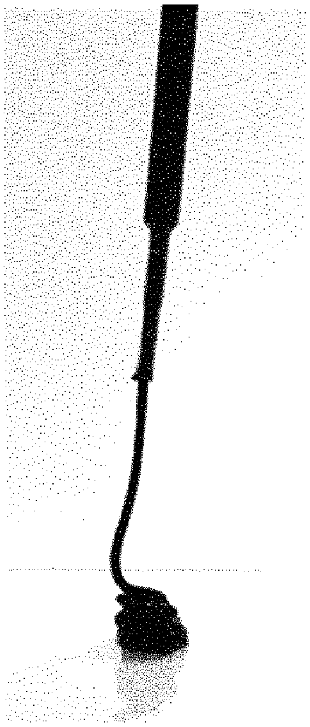
[FIG. 10b]
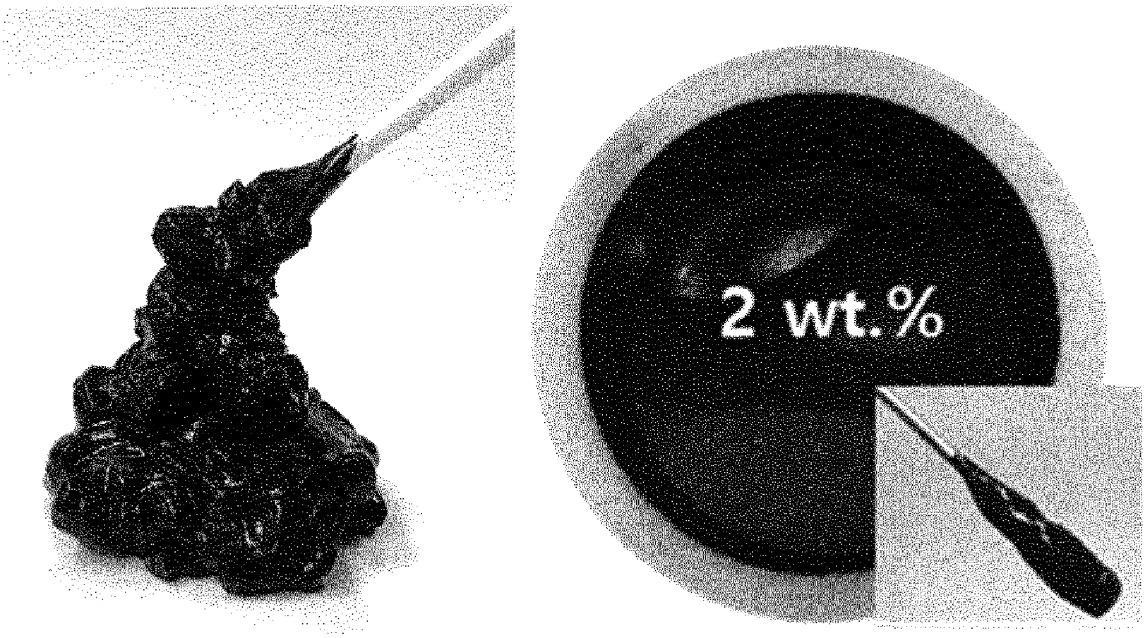

[FIG. 10c]
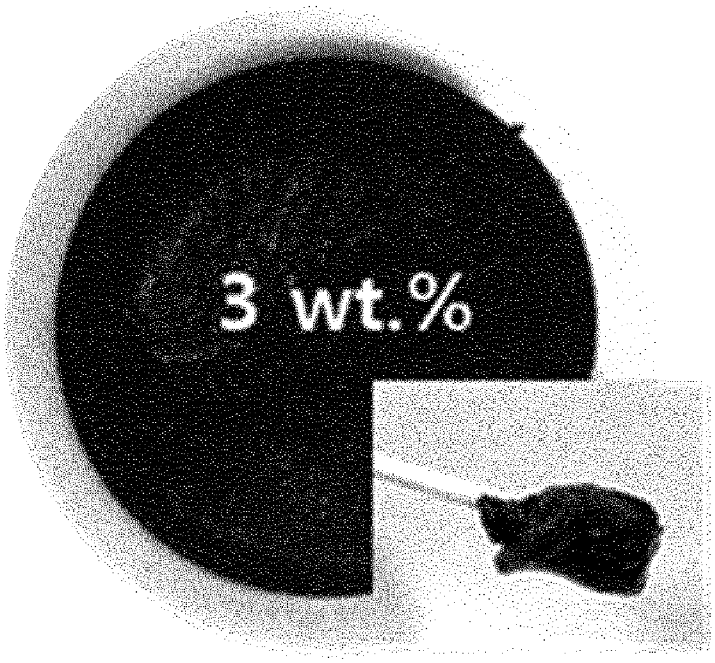
[FIG. 10d]
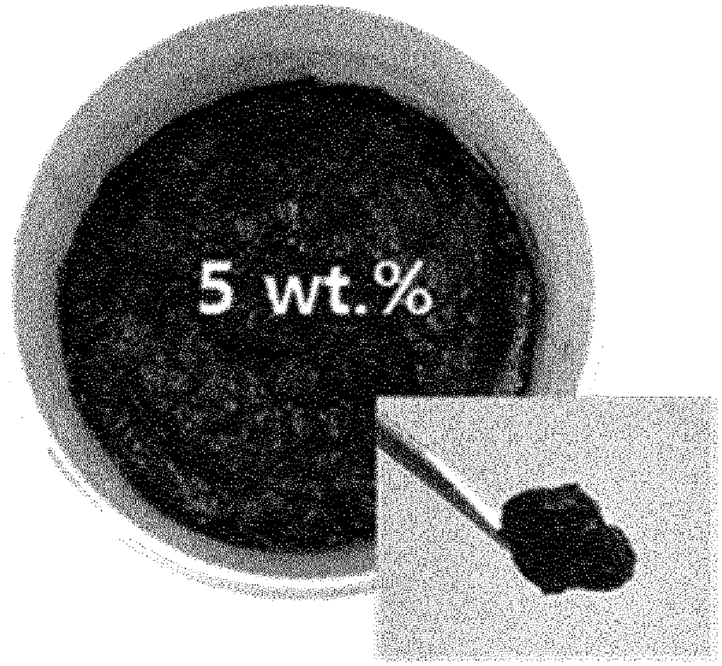

[FIG. 10e]
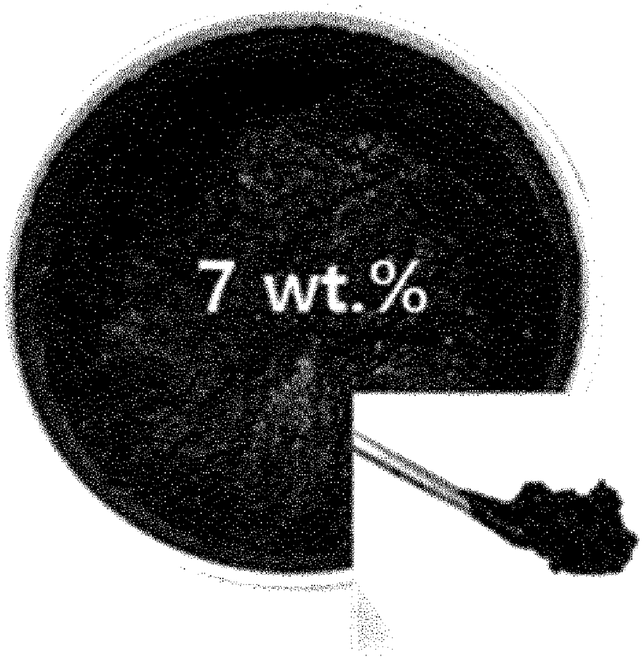
[FIG. 10f]
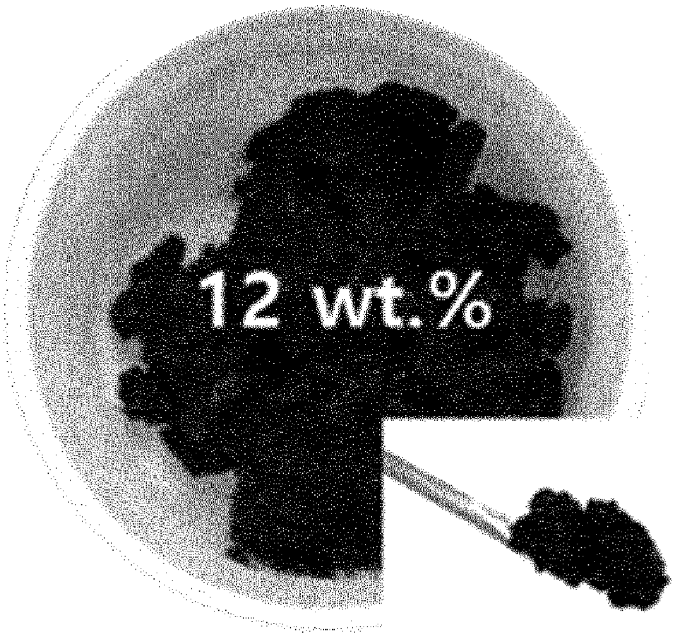

REDUCED GRAPHENE OXIDE FOR SECONDARY BATTERY, PREPARATION METHOD THEREFOR, AND ELECTRODE AND SECONDARY BATTERY WHICH USE SAME

TECHNICAL FIELD

The present disclosure relates to a reduced graphene oxide, a preparation method thereof, an electrode using the reduced graphene oxide, and a secondary battery using the reduced graphene oxide.

BACKGROUND ART

In secondary batteries, electrode materials vary depending on their application fields, and the battery performance is degraded due to surface characteristics of electrode materials, diversity in size, and side reactions with active materials, conductive materials, or binders. For example, in the case of a silicon-based high-capacity anode material, a volume change of about 300% or more occurs due to a change in the crystal structure during absorption and storage of lithium ions, and a phenomenon in which the structure of silicon collapses due to the repeated volume changes occurs, resulting in a decrease in initial efficiency and deterioration in cycle characteristics. Therefore, a technology for maintaining high capacity of a lithium ion battery while improving reversibility is essential.

To this end, there has an attempt to improve mechanical and electrical properties compared to existing particle-shaped carbon black conductive materials by using a low-dimensional carbon nano material-based conductive material such as graphene having structural stability and high electrical conductivity, and there has been an attempt to overcome the limit of silicon such as structural collapse of silicon due to volume changes by forming a reduced graphene oxide-silicon composite having a stable core-shell structure which is formed by coating silicon particles with a reduced graphene oxide having high conductivity.

The existing reduced graphene oxide is manufactured by forming graphene oxide through exfoliation of graphite and then heat treating or reducing the graphene oxide. Due to many defects generated during oxidation, exfoliation, and reduction processes, the specific surface area of the existing reduced grapheme oxide is more than hundreds to thousands of $m^2/g$, thereby causing side reactions in the electrodes of secondary batteries and reducing electrical conductivity. In particular, there is a problem in that the increase in the specific surface area deteriorates the electrochemical properties of the secondary battery and causes a decrease in the lifespan of the secondary battery.

In connection with this, Korean Patent No. 10-1799639 titled "Method of Manufacturing Reduced Graphene Oxide Composite, Reduced Graphene Oxide Composite Manufactured Thereby, and Supercapacitor Including Same" discloses a reduced graphene oxide manufactured through oxidation using the existing Hummer's method and through the existing exfoliation and reduction processes. The reduced graphene oxide is characterized in that the specific surface area increases due to defects and a decrease in crystallinity. The disclosed technique is a method using a high specific surface area as a way to improve the characteristics of a supercapacitor.

The reduced graphene oxides being currently available and mass-produced have a specific surface area of about 400 to 800 $m^2/g$. When the existing reduced graphene oxides are used as additives, side reactions may occur. (Global Graphene Group (G3) company, https://www.theglobalgraphenegroup.com). The reduced graphene oxides are known as materials having a high specific surface area. Therefore, it is desirable to apply such reduced graphene oxides to supercapacitors requiring a high specific surface area. However, in the case of secondary batteries, it is required to use a low specific surface area not to cause side reactions in the electrodes thereof.

In Korean Patent No. 10-1297423 titled "Reduced Graphene Oxide Dispersed in High Concentration by Cation-pi Interaction and Preparation Method Thereof", a reduced graphene oxide is disclosed in which in a graphene oxide dispersion solution, a cation is located at the center of an array in which carbon atoms are connected by $sp^2$ bonds in a two-dimensional hexagonal shape, and an interaction between the cation and the pi structure of the sp2 region is formed. Although the document discloses a method for producing a reduced graphene oxide having excellent crystallinity, the document does not teach a specific surface area to control side reactions, specific electrical conductivity, and physical properties of reduced graphene oxide according to the thickness of graphene, for the purposes of application to secondary batteries. Moreover, in the document, the ranges of physical properties of the reduced graphene oxides which can be suitably applied to secondary batteries are not reported.

In addition, when the thickness is tens of nm or more, such as graphene nanoplatelets (GNPs), the specific surface area is reduced to 100 $m^2/g$ or less, but the graphene nanoplatelets have the disadvantage of a low electrical conductivity because they have a structure in which graphene is laminated. In the case of a reduced graphene oxide uniformly exfoliated to a thickness of 5 nm or less, it may have a specific surface area of hundreds to thousands of $m^2/g$ when measured by BET testing.

As described above, although the specific surface area is an important factor affecting side reactions in the electrodes of secondary batteries, there has been little research on a reduced graphene oxide with a controlled specific surface area to prevent the internal side reactions of the electrodes of secondary batteries.

DISCLOSURE

Technical Problem

The present disclosure has been made to solve the above problems, and the problem to be solved by the present disclosure is to provide a reduced graphene oxide having a predetermined thickness, a low specific surface area, and a high electrical conductivity to be suitably applicable to a secondary battery, a preparation method of the reduced graphene oxide, an electrode made using the reduced graphene oxide, and a secondary battery using the reduced graphene oxide.

Technical Solution

In order to solve one technical problem described above, the present disclosure provides a powdery two-dimensional crystalline reduced graphene oxide for a secondary battery, the reduced graphene oxide satisfying Relational Expressions 1 to 3 shown below:

$$1 \le T_Q \le 5 \quad \text{[Relational Expression 1]}$$

$$100 \le E_Q \le 1{,}000 \quad \text{[Relational Expression 2]}$$

$1 \leq BET_Q \leq 100$ [Relational Expression 3]

In Relational Expression 1, $T_Q$ represents the thickness (nm) of the reduced graphene oxide. In Relational Expression 2, $E_Q$ represents the electrical conductivity (S/cm) of the reduced graphene oxide. In Relational Expression 3, $BET_Q$ represents the specific surface area ($m^2/g$) of the reduced graphene oxide.

In the present disclosure, the crystalline reduced graphene oxide may be obtained by synthesizing graphite oxide flakes from graphite flakes in a powder form, putting the graphite oxide flakes in a solvent, exfoliating and dispersing the graphite oxide flakes through pH control, and reducing and spray-drying the graphite oxide flakes.

In the present disclosure, the crystalline reduced graphene oxide may be formed to have sizes in a range of 1 to 10 μm.

In the present disclosure, the crystalline reduced graphene oxide may form a low-content ink in which the crystalline reduced graphene oxide as a solid is dispersed in a low content of 0.1 wt % or more and 0.9 wt % or less.

In the present disclosure, the crystalline reduced graphene oxide may form a high concentration paste in which the crystalline reduced graphene oxide as a solid is dispersed in a high concentration of 0.9 wt % or more and 10 wt % or less.

In order to solve another technical problem described above, the present disclosure provides a method of preparing a reduced graphene oxide for a secondary battery, the method including: synthesizing graphite oxide flakes from powdery graphite flakes; preparing a graphene oxide dispersion solution by putting the graphite oxide flakes in a solvent and exfoliating and dispersing the graphite oxide flakes in the solvent through pH control; preparing a reduced graphene oxide dispersion solution by reducing the graphene oxide dispersion solution; and preparing the reduced graphene oxide in powder form by spray-drying the reduced graphene oxide dispersion solution, in which the reduced graphene oxide is a powdery two-dimensional crystalline reduced graphene oxide satisfying Relational Expressions 1 to 3 shown below.

$1 \leq T_Q \leq 5$ [Relational Expression 1]

$100 \leq E_Q \leq 1{,}000$ [Relational Expression 2]

$1 \leq BET_Q \leq 100$ [Relational Expression 3]

In Relational Expression 1, $T_Q$ represents the thickness (nm) of the reduced graphene oxide. In Relational Expression 2, $E_Q$ represents the electrical conductivity (S/cm) of the reduced graphene oxide. In Relational Expression 3, $BET_Q$ represents the specific surface area ($m^2/g$) of the reduced graphene oxide.

In order to solve a further technical problem, the present disclosure provides an electrode in which a current collector is coated with the reduced graphene oxide.

In order to solve a yet further technical problem, the present disclosure provides a secondary battery including the electrode.

Advantageous Effects

According to the present disclosure providing the means to solve the technical problems, a conductive material or a composite anode material based on a reduced graphene oxide with a low specific surface area and a high electrical conductivity for a secondary battery can be mass-produced through a simple process. Therefore, there is an effect of improving the performance of a secondary battery electrode that requires high capacity, long lifespan, and highly stable electrochemical properties.

DESCRIPTION OF DRAWINGS

FIG. 1 is a graph showing comparison results of the thickness of a graphene oxide according to Example 1 and the thickness of a graphene oxide according to Comparative Example 1;

FIG. 2 is a graph showing the electrical conductivity of a reduced graphene oxide according to Example 1 and the electrical conductivity of a reduced graphene oxide according to Comparative Example 1;

FIGS. 3*a* and 3*b* are graphs showing the BET specific surface areas of the reduced graphene oxides according to Example 1 and Comparative Example 1;

FIG. 4 is a graph showing thermogravimetric analysis (TGA) results of the reduced graphene oxides according to Example 1 and Comparative Example 1;

FIGS. 5*a* to 5*f* are transmission electron microscope (TEM) images showing the reduced graphene oxides according to Example 1 and Comparative Example 1;

FIG. 6 is a graph showing UV-vis spectra of the reduced graphene oxides according to Example 1 and Comparative Example 1;

FIGS. 7*a* to 7*b* are graphs showing the evaluation results of electrochemical properties when using the reduced graphene oxides according to Example 1 and Comparative Example 1;

FIG. 8 is a graph showing the evaluation results of electrochemical properties when using the reduced graphene oxide according to Example 1 and an existing conductive material;

FIG. 9 is a photograph showing a low-content ink prepared from the reduced graphene oxide according to Example 1; and FIGS. 10*a* to 10*f* are photographs showing a high concentration paste prepared from the reduced graphene oxide according to Example 1.

BEST MODE

Hereinafter, the present disclosure will be described in detail.

In one aspect, the present disclosure relates to a reduced graphene oxide for a secondary battery, in which the reduced graphene oxide is a powdery two-dimensional crystalline reduced graphene oxide satisfying Relational Expressions 1 to 3 shown below.

$1 \leq T_Q \leq 5$ [Relational Expression 1]

$100 \leq E_Q \leq 1{,}000$ [Relational Expression 2]

$1 \leq BET_Q \leq 100$ [Relational Expression 3]

In Relational Expression 1, $T_Q$ represents the thickness (nm) of the reduced graphene oxide. In Relational Expression 2, $E_Q$ represents the electrical conductivity (S/cm) of the reduced graphene oxide. In Relational Expression 3, $BET_Q$ represents the specific surface area ($m^2/g$) of the reduced graphene oxide.

Conventional graphite-based anode materials have a theoretical capacity upper limit of 375 mAh/g. Therefore, it is essential to develop silicon-based raw materials having a theoretical capacity of 3,580 mAh/g which is four times larger than that of the graphite-based anode materials. However, silicon has a problem in that the performance of the secondary battery rapidly decreases because the volume expands by about 300% or more while charging and discharging are repeated. In order to alleviate this phenomenon, research on binders and conductive materials is being actively conducted. In particular, carbon black, which has been used as a conductive material in the past, has a low specific surface area, low electrical conductivity, and a particle-shaped 0-dimensional structure. Therefore, carbon black has the disadvantages of contact resistance and the inability to prevent volume expansion of the anode active material, which was not a problem in traditional graphite-based applications. On the other hand, graphene, which is a carbon nanomaterial, has excellent electrical conductivity, is electrochemically stable, can effectively protect silicon from electrolytes, and has a mesh structure with excellent mechanical strength, thereby having the advantage of mitigating cracking by reducing structural stress attributable to volume expansion of silicon. However, in the case of general graphene, a solid electrolyte interface (SEI) layer may be excessively formed during charging and discharging due to a high specific surface area of several hundreds of $m^2/g$ or more, and thus initial efficiency and lifespan characteristics may be degraded.

For this reason, the present disclosure provides a reduced graphene oxide, which is a two-dimensional carbon nanomaterial having excellent electrical conductivity, a low specific surface area, and good chemical and mechanical stability. Due to the advantages, the reduced graphene oxide can be used as a conductive material for secondary batteries and as an anode coating material.

In order to implement a highly crystalline reduced graphene oxide having a low specific surface area and high electrical conductivity, a highly pure and highly crystalline graphene oxide is formed, and a high concentration reduced graphene oxide is formed through cation-pi interaction and chemical reduction. As such, since the reduced graphene oxide has a high electrical conductivity and a low specific surface area, the reduced graphene oxide can easily function as a conductive material without causing side reactions in the electrode.

The thickness of the reduced graphene oxide is preferably made in the range of 1 to 5 nm. The thickness is measured before the reduction of a graphene oxide. When the thickness is smaller than 1 nm or is larger than 5 nm, there are disadvantages in that the bonding strength or adhesive strength with a current collector constituting an electrode such as an anode is weak, and the miscibility in an anode slurry is poor. In addition, when the thickness of the reduced graphene oxide exceeds 5 nm, it cannot be considered that the exfoliation was successful.

In terms of the electrical conductivity of a reduced graphene oxide, high electrical conductivity means excellent crystallinity. The reduced graphene oxide according to the present disclosure has an electrical conductivity of 100 to 1,000 S/cm. When a reduced graphene oxide is poor in crystallinity, the electrical conductivity of the reduced graphene oxide cannot exceed 100 S/cm. When the electrical conductivity of a reduced graphene oxide powder is lower than 100 S/cm, the reduced graphene oxide powder is considered to have poor crystallinity, and such a reduced graphene oxide cannot improve the electrochemical properties of a secondary battery. On the other hand, when the electrical conductivity of a reduced graphene oxide exceeds 1,000 S/cm, it is meaningful in terms of realizing a high electrical conductivity. However, it is currently difficult to obtain a commercialized product having a value exceeding 1,000 S/cm. As the electrical conductivity is increased, the dispersion stability tends to decrease, and thus a problem occurs in compounding for manufacturing applications as end products.

In terms of the Brunauer-Emmett-Teller (BET) surface area of a reduced graphene oxide, the specific surface area of graphite is generally several to several tens $m^2/g$. In the case of graphene, since it is exfoliated from graphite, the specific surface area of graphene increases to be more than several hundred $m^2/g$. That is, when the thickness of general graphene is 1 to 5 nm, the specific surface area is several hundreds of $m^2/g$ or more.

However, unlike general graphene, the reduced graphene oxide according to the present disclosure has a specific surface area of 1 to 100 $m^2/g$ when the reduced graphene oxide has a thickness of 1 to 5 nm. In other words, the specific surface area of a reduced graphene oxide varies depending on the relative number of defects, which is a measure of crystallinity. There is a report that according to an example of applying a reduced graphene oxide to a supercapacitor by increasing the number of defects, potassium is used to induce defects in graphene, thereby increasing the specific surface area to more than 3,000 $m^2/g$ (Y. Zhu et al., Science 2011, 332(6037), 1537-1541). In this way, as the number of defects of a reduced graphene oxide increase, the BET specific surface area tends to increase.

When the reduced graphene oxide according to the present disclosure has a thickness of 1 to 5 nm, the reduced graphene oxide has a high crystallinity of 100 to 1,000 S/cm, thereby having good crystallinity. In addition, the reduced graphene oxide has a relatively low specific surface area of 1 to 100 $m^2/g$ as measured by the BET method compared to general graphene.

There is no case that the specific surface area of the reduced graphene oxide is less than 1 $m^2/g$. Since the reduced graphene oxide has a two-dimensional structure because it is produced by exfoliation from graphite, the specific surface area generally tends to increase.

When the reduced graphene oxide has a specific surface area of more than 100 $m^2/g$, side reactions with an active material or, in some cases, an electrolyte may occur excessively, resulting in reduced stability at high temperatures. This may result in a decrease in the initial efficiency of a secondary battery and deterioration in life characteristics in the long term. That is, when the specific surface area of a reduced graphene oxide increases and exceeds 100 $m^2/g$, the thickness of a passivation film formed during charging and discharging increases, and thus the efficiency and lifespan of a secondary battery are rapidly reduced. In addition, the usage of a binder needs to be increased. When the content of the binder that does not contribute to charging and discharging in the electrode increases, the capacity of a secondary battery decreases.

The crystalline reduced graphene oxide having a thickness in the range of 1 to 5 nm, electrical conductivity in the range of 100 to 1,000 S/cm, and a specific surface area in the range of 1 to 100 $m_2/g$ measured by the BET method may form a dispersed low-content ink in which the crystalline reduced graphene oxide as a solid phase is contained in an amount of 0.1 wt % or more and 0.9 wt % or less, or a high concentration paste in which the crystalline reduced graphene oxide as a solid phase is contained in an amount of 0.9 to 10 wt %.

In the ink formed by introducing the reduced graphene oxide, when the water-based solid of the reduced graphene oxide has a content of less than 0.1 wt %, the amount of the reduced graphene oxide in the ink is excessively small.

When the ink is used in various applications, there is a disadvantage in that a negligible amount of graphene is introduced. On the other hand, when the amount of the reduced graphene oxide exceeds 0.9 wt %, the resulting product becomes a paste rather than an ink. In the paste formed by introducing the reduced graphene oxide, when the solid content is 0.9 wt % or less, the end product becomes an ink. When the solid content exceeds 10 wt %, the viscosity becomes excessively high, and thus the end product is called a cake rather than a paste.

In another aspect, the present disclosure relates to a method for preparing a reduced graphene oxide for a secondary battery, the method including: step S10 of synthesizing graphite oxide flakes from graphite flakes in a powder form; step S20 of preparing a graphene oxide dispersion solution by introducing the graphite oxide flakes into a solvent and exfoliating and dispersing the graphite oxide flakes through pH adjustment; step S30 of preparing a reduced graphene oxide dispersion solution by reducing the graphene oxide dispersion solution; and step S40 of preparing a powdery reduced graphite oxide by spray-drying the reduced graphene oxide dispersion solution. By the preparation method, a crystalline reduced graphene oxide having a thickness of 1 to 5 nm, an electrical conductivity of 100 to 1,000 S/cm, and a BET specific surface area of 1 to 100 $m^2/g$ is obtained.

At step S10 of the above-described preparation method, first, graphite oxide flakes are synthesized from graphite flakes in a powder form.

That is, low-defect, high-purity graphite oxide flakes are synthesized from powdery graphite flakes through a modified Brodie method. To this end, pure graphite flakes, fuming nitric acid, and sodium chloride oxide are mixed and stirred. Next, neutralization, washing, filtration, cleaning, and drying are performed to remove impurities.

Next, at step S20, the graphite oxide flakes are put into a solvent, and the graphite oxide flakes are exfoliated and dispersed through pH control to prepare the graphene oxide dispersion solution.

In the case of the general Hummer's method, many defects occur, and there is a disadvantage that gas is attached to the defective portions. Accordingly, the graphite oxide flakes are treated with a homogenizer at 10,000 to 20,000 rpm for 30 minutes to 2 hours in distilled water (pH 10) in which salts such as potassium hydroxide and sodium hydroxide are dissolved, to form a highly crystalline graphene oxide dispersion solution with a low specific surface area.

Next, at step S30, the graphene oxide dispersion solution is reduced to prepare the reduced graphene oxide dispersion solution.

Prior to the reduction, the graphene oxide dispersion solution was left intact at room temperature for 1 hour or more, and the stationary graphene oxide dispersion solution is freeze-dried for 8 to 24 hours or more to obtain a graphene oxide powder. A graphene oxide dispersion solution having a concentration of 100 mg/l is prepared by dispersing the graphene oxide powder in distilled water again, hydroiodic acid (HI acid) is then added to the graphene oxide dispersion solution, and the solution is reduced under stirring. In this way, it is possible to form a reduced graphene oxide dispersed in high concentration. Here, the size of the reduced graphene oxide may become in the range of 1 to 10 μm. When the size is less than 1 μm, the reduced graphene oxide does not have a sufficient size to serve as a conductive material. When the size exceeds 10 μm, since the reduced graphene oxide is a two-dimensional sheet-shaped material, the reduced graphene oxide is inefficient because it can wrinkle and occupy a large volume.

In the present step, it is possible to prepare an electrically conductive reduced graphene oxide based on a highly crystalline reduced graphene oxide having a low specific surface area by reducing the graphene oxide dispersion solution. Here, the reduced graphene oxide can be obtained as a high concentration paste phase.

Finally, at step S40, the reduced graphene oxide dispersion solution is spray-dried to prepare a powdery reduced graphene oxide.

It is possible to prepare a powder by spray drying the reduced graphene oxide dispersion solution existing as a suspension phase or a paste phase in order to prevent restacking. Such a powder may be a crystalline reduced graphene oxide powder having a two-dimensional structure.

The reason why the reduced graphene oxide dispersion solution is powdered by spray drying is to prevent restacking between the reduced graphene oxide particles. Especially, it is essential when measuring the specific surface area. That is, it is to remove a specific surface area factor that can be lowered when the reduced graphene oxide is restacked to form a layered structure which is the structure of graphite, in the process of drying the reduced graphene oxide. In addition, it is to more precisely measure the specific surface area of the reduced graphene oxide powder produced through the exfoliation. When restacking of the reduced graphene oxide occurs, the specific surface area decreases and a graphite-like structure is formed, so the specific surface area of the graphene cannot be precisely measured. Therefore, the measured value is unreliable.

The powdery reduced graphene oxide having a two-dimensional crystalline structure can be used as it is, as a conductive material. In some cases, the crystalline reduced graphene oxide and silicon metal particles are prepared as a dispersion solution, and the dispersion solution is spray-dried to easily mass-produce a reduced graphene oxide-silicon metal particle composite powder. In particular, it is possible to manufacture a high-performance anode capable of maintaining high capacity and reversibility through the manufacture of electrode plates to which a reduced graphene oxide-based conductive material and a reduced graphene oxide-silicon metal particle composite are applied.

That is, the powdery crystalline reduced graphene oxide prepared through the above-described process has a thickness of 1 to 5 nm, an electrical conductivity of 100 to 1,000 S/cm, and a specific surface area of 1 to 100 $m^2/g$ measured by the BET measurement method. The prepared reduced graphene oxide is applied to the surface of an anode current collector as a conductive additive, thereby having the advantage of preventing side reactions with an active material or a binder. Therefore, the crystalline reduced graphene oxide powder having a low specific surface area and high crystallinity prepared by the above-described process can be used as a coating material for an aqueous dispersion of metal particles such as silicon particles, suppression of surface side reactions, and improvement of electrical conductivity.

In another aspect, the present disclosure relates to a secondary battery including an electrode such as an anode. More particularly, the present disclosure relates to an anode including a current collector coated with a crystalline reduced graphene oxide having a two-dimensional structure, a thickness of 1 to 5 nm, an electrical conductivity of 100 to 1,000 S/cm, and a specific surface area of 1 to 100 m/g measured by the BET method, and to a secondary battery including the anode.

The anode constitutes an electrode assembly in conjunction with a separator and a cathode including a cathode active material. The electrode assembly and electrolyte are accommodated in an exterior case to form a lithium secondary battery. The anode is composed of a current collector having the surface coated with an anode slurry. The anode slurry may be composed of an anode active material, a binder, additives, and the two-dimensional-structure crystalline reduced graphene oxide of the present disclosure serving as a conductive material.

The current collector may be any one selected from the group consisting of copper foil, nickel foil, stainless steel foil, titanium foil, nickel foam, copper foam, a polymer substrate coated with a conductive metal, and various combinations thereof.

Hereinafter, examples of the present disclosure will be described in detail. The examples below are provided only to aid understanding of the present disclosure and thus should not be construed as limiting to the scope of the present disclosure.

<Example 1> Preparation of Reduced Graphene Oxide Using Modified Brody Method 1-1. Preparation of Graphene Oxide Powder 10 g of pure graphite (with a purity of 99.9995%, −200 mesh, manufactured by Alfar Aesar), 350 ml fuming nitric acid, and 74 g of sodium chloride oxide ($NaClO_4$) were sequentially mixed at room temperature. In this case, the sodium chloride oxide was divided and mixed at two steps. That is, 37 g of the sodium chloride oxide 37 g was added each time. The mixture was stirred for 48 hours, followed by neutralization, washing, filtration, cleaning, and drying, which produced a graphene oxide. The graphene oxide produced through the processes described above was treated with a homogenizer in distilled water (pH 10) in which KOH was dissolved at a concentration of 300 mg/L for 1 hour, at 15,000 rpm to obtain a uniformly dispersed graphene oxide dispersion solution. Thereafter, the graphene oxide dispersion solution was left intact at room temperature for a reaction time of 1 hr or more to cause a cation-pi interaction. Next, the dispersion was freeze-dried for 10 hrs or more to obtain a graphene oxide powder.

1-2. Preparation of Reduced Graphene Oxide Powder

Distilled water was used as a solvent for dispersing the graphene oxide powder to produce a graphene oxide dispersion solution. 17 μl of HI acid was added to the graphene oxide dispersion solution having a concentration of 300 mg/L, followed by stirring at 400 rpm for 16 hrs for reduction. As a result, a reduced graphene oxide dispersed at a high concentration, called a reduced graphene oxide dispersion solution, was obtained. The solution was spray-dried to obtain a reduced graphene oxide powder.

<Comparative Example 1> Preparation of Reduced Graphene Oxide Using Modified Hummer's Method 1-1. Preparation of Graphene Oxide Powder 10 g of pure graphite (with a purity of 99.9995%, −200 mesh, manufactured by Alfar Aesar), 700 ml of sulfuric acid, and 30 g of potassium permanganate ($KMnO_4$) were sequentially mixed at room temperature. In this case, the potassium permanganate was divided and mixed at two steps. That is, 15 g of the potassium permanganate was added each time. The mixture was stirred at 40° C. for 48 hrs, and distilled water was added thereto in an ice bath to minimize exotherm during neutralization. Graphene oxide was prepared through washing, filtration, cleaning, and drying processes. The graphene oxide produced through the processes described above was treated with a homogenizer in distilled water (pH 10) at a concentration of 300 mg/L for 1 hr, at 15,000 rpm to obtain a uniformly dispersed graphene oxide dispersion solution. Thereafter, the graphene oxide dispersion solution was freeze-dried for 10 hrs or more to prepare s graphene oxide powder.

1-2. Preparation of Reduced Graphene Oxide Powder

Distilled water was used as a solvent for dispersing the graphene oxide powder to produce a graphene oxide dispersion solution. 17 μl of HI acid was added to the graphene oxide dispersion solution having a concentration of 300 mg/L, followed by stirring at 400 rpm for 16 hrs for reduction. As a result, a reduced graphene oxide dispersed at a high concentration, called a reduced graphene oxide dispersion solution, was obtained. The solution was spray-dried to obtain a reduced graphene oxide powder.

<Experimental Example 1> Thickness Measurement Analysis of Graphene Oxide

In this experimental example, analysis was performed by measuring the thickness of the graphene oxide formed in the process of preparing the reduced graphene oxide according to Example 1 and the thickness of the graphene oxide formed in the process of preparing the reduced graphene oxide according to Comparative Example 1.

In this regard, the thickness of each of the graphene oxides of Example 1 and Comparative Example 1 was measured with an atomic force microscope exhibiting a high vertical resolution and thereby being capable of accurately determining the thickness of a nanomaterial.

Since the reduced graphene oxide has a hydrophobic property, when a sample of the reduced graphene oxide is applied to a silicon substrate, its adhesion with the surface of the silicon substrate is not good, and the reduced graphene oxide wrinkles. Therefore, it is difficult to accurately determine the thickness thereof. Therefore, when graphene oxide having good adhesion to a silicon substrate due to oxidation functional groups present on the surface thereof is used, the thickness of graphene can be measured more accurately. Therefore, in the present experimental example, the thickness of graphene oxide was measured.

The results are shown in FIG. 1. FIG. 1 is a graph showing comparative results of the thickness of a graphene oxide according to Example 1 and the thickness of a graphene oxide according to Comparative Example 1. Referring to FIG. 1, it was confirmed that both the quasi defect-free graphene oxide (QGO) prepared using the modified Brodie's method according to Example 1 and the Hummers graphene oxide (HTO) prepared using the modified Hummers' method according to Comparative Example 1 had an average thickness of about 1 nm after exfoliation. This means that the exfoliation was reliably performed. However, the reason why the thickness of the graphene oxide was measured is because, as mentioned above, the thickness of the graphene oxide is the same as the thickness of the reduced graphene oxide.

<Experimental Example 2> Analysis of Electrical Conductivity of Reduced Graphene Oxide In this experimental example, six samples of the reduced graphene oxide according to Example 1 and six samples of the reduced graphene oxide according to Comparative Example 1 were prepared, and the electrical conductivity of each sample was measured and analyzed.

In this regard, FIG. 2 is a graph showing electrical conductivity evaluation results of the reduced graphene oxide according to Example 1 and the reduced graphene oxide according to Comparative Example 1. Referring to FIG. 2, the electrical conductivity of the reduced quasi defect-free reduced graphene oxide (QrGO) according to Example 1 and the Hummer reduced graphene oxide (HrGO) prepared by the conventional preparation method as in Comparative Example 1 can be confirmed. The electrical conductivity of each of the reduced graphene oxides according to Example 1 and Comparative Example 1 was measured a total of 6 times, and each result is shown in Table 1 below.

TABLE 1

| | Electrical conductivity (S/cm) | | | | | |
|---|---|---|---|---|---|---|
| | 1 | 2 | 3 | 4 | 5 | 6 |
| QrGO | 92,813 | 84,980 | 107,614 | 82,590 | 90,580 | 104,167 |
| HrGO | 7,002 | 7,501 | 7,812 | 7,518 | 9,689 | 7,880 |

Referring to Table 1, the ideal electrical conductivity of the reduced graphene oxide according to Example 1 is in the range of from $1\times10^2$ to $2\times10^3$ S/cm. That is, it is confirmed that the quasi defect-free reduced graphene oxide of Example 1 has an average electrical conductivity of about 1,000 S/cm. On the other hand, the Hummer reduced graphene oxide (HrGO) of Comparative Example 1 has an average electrical conductivity of about 100 S/cm or less.

<Experimental Example 3> Analysis of Specific Surface Area of Reduced Graphene Oxide by BET Measurement In this experimental example, four samples of the reduced graphene oxide according to Example 1 and the reduced graphene oxide according to Comparative Example 1 were analyzed for specific surface area characteristics by the BET measurement method. For the measurement, the nitrogen gas adsorption distribution method and a porosimetry analyzer (Bell Japan Inc, Belsorp-II mini) were used.

In this regard, the specific surface area measured by the BET method increases with an increase in the number of defects in the reduced graphene oxide, and the amount of nitrogen gas adsorbed increases. This can be confirmed from FIGS. 3*a* and 3*b* which are graphical representations showing the BET specific surface areas of the reduced graphene oxides according to Example 1 and Comparative Example 1. That is, FIG. 3*a* shows the specific surface area of the reduced graphene oxide according to Example 1, and FIG. 3*b* shows the specific surface area of the reduced graphene oxide according to Comparative Example 1. The specific surface area evaluation results of the reduced graphene oxides according to Example 1 and Comparative Example 1 are shown in Table 2 below.

TABLE 2

| | Specific surface area ($m^2$/g) | | | |
|---|---|---|---|---|
| | 1 | 2 | 3 | 4 |
| QrGO | 15.0 | 21.5 | 67.8 | 188.2 |
| HrGO | | 851.0 | | |

Referring to Table 2 and FIGS. 3*a* and 3*b*, the specific surface area characteristics of the reduced graphene oxide (QrGO) according to Example 1 and the reduced graphene oxide (HrGO), which was prepared by the existing method, according to Comparative Example 1 can be confirmed. Changes in adsorption (ADS) and desorption (DES) according to the specific surface area measured by the BET measurement method were determined. It is confirmed that the reduced graphene oxide (QrGO) according to Example 1 exhibits a value of about 21.5 $m^2$/g, and the reduced graphene oxide (HrGO) according to Comparative Example 1 exhibits a value of about 851 $m^2$/g.

The reduced graphene oxide (HrGO) according to Comparative Example 1, which is generally prepared, exhibits a value of about 400 to 900 $m^2$/g. In particular, in the case of BET measurement of graphene, the measurement sample prepared by the filtration method is restacked and thus exhibits the same characteristics (for example, a low specific surface area of several tens of $m^2$/g) as graphite. Therefore, the samples to be measured needs to be prepared through spray drying not to case restacking. The measurement results of the samples according to Example 1 and Comparative Example 1 were prepared through spray drying. As can be confirmed from the thickness measurement results of FIG. 1, the measurement was performed after graphene oxide exfoliation was easily performed.

As a result, it was confirmed that the reduced graphene oxide (QrGO) according to Example 1 had a specific surface area of several tens of $m^2$/g lower than that of the reduced graphene oxide (HrGO) according to Comparative Example 1. This reveals that the reduced graphene oxide (QrGO) according to Example 1 is crystalline, has a reduced number of defects, and rarely shows an increase in specific surface area, which is caused by an increase in the number of defects.

<Experimental Example 4> Analysis of Crystallinity of Reduced Graphene Oxide

In this experimental example, the crystallinity of each of the reduced graphene oxide according to Example 1 and the reduced graphene oxide according to Comparative Example 1 was analyzed.

In this regard, FIG. 4 is a graph showing the results of thermogravimetric analysis (TGA) of the reduced graphene oxides according to Example 1 and Comparative Example 1, and the degree of crystallinity according to the difference in decomposition temperature of the reduced graphene oxides can be indirectly checked. As shown in FIG. 4, the reduced graphene oxide (QrGO) according to Example 1 decomposes at temperature that is 100° C. higher than the decomposition temperature of the reduced graphene oxide (HrGO) according to Comparative Example 1, prepared by an existing preparation method. The results of the experiment mean that the reduced graphene oxide according to Example 1 has improved crystallinity. In the case of graphite, since it has crystallinity in its natural state, it decomposes at temperature that is 100° C. higher than the decomposition temperature of the reduced graphene oxide according to Example 1. Referring to FIG. 4, it is confirmed that the reduced graphene oxide according to Example 1 has a crystallinity close to that of graphite. This means that the reduced graphene oxide according to Example 1 exhibits thermal stability.

FIGS. 5*a* to 5*f* are transmission electron microscope (TEM) images of the reduced graphene oxides according to Example 1 and Comparative Example 1. The TEM images visualize the crystallinity of the reduced graphene oxides.

FIGS. 5*a*, 5*b*, and 5*c* are TEM images of the reduced graphene oxide (QrGO) according to Example 1, and FIGS. 5*d*, 5*e*, and 5*f* are TEM images of the reduced graphene oxide (HrGO) according to Comparative Example 1. The reduced graphene oxide according to Example 1 has relatively small point-like defects but the reduced graphene oxide according to Comparative Example 1 has relatively large hole-like defects. This means that the reduced graphene oxide according to Comparative Example 1 has lower crystallinity on the surface thereof. In the case of the diffraction pattern of the selected area electron diffraction pattern (SAED) shown in the inset, since the reduced graphene oxide (QrGO) according to Example 1 has excellent crystallinity, a regular pattern of dots is shown as shown in part A of FIG. 5*c*. In contrast, in the case of the reduced graphene oxide (HrGO) according to Comparative Example 1, a typical ring-shaped pattern appears as with the case of an amorphous structure (see FIGS. 5*c* and 5*f*).

FIG. 6 is a graph showing the UV-vis spectra results of the reduced graphene oxides according to Example 1 and Comparative Example 1. The degree of crystallinity can be determined on the basis of the peak positions and the presence or absence of peaks formed in the UV-vis spectra. In general, the intensity of the reduced graphene oxide (QrGO) according to Example 1 at the peak of the pi-pi star (250 nm) appearing at the C—C and C═C bonds of graphene oxide is higher than that of the reduced graphene oxide (HrGO) according to Comparative Example 1. The peak appearing at the n-pi star transition around 300 nm mainly represents the $sp^3$ hybridized domain and is affected by oxidation functional groups. However, the graphene oxide (QGO) of Example 1 shows a clear polycyclic aromatic hydrocarbon peak due to the high crystallinity thereof, which is due to the excellent surface crystallinity of the graphene oxide (QGO) and is generated by the $sp^2$ domain. In the case of using this measurement method, a peak that does not generally appear in graphene oxide produced through strong acid treatment can be observed. From the results, it can be confirmed that the reduced graphene oxide (QrGO) according to Example 1 has excellent crystallinity.

<Experimental Example 5> Analysis and Evaluation of Electrochemical Properties

In this experimental example, the electrochemical properties of each of the reduced graphene oxide according to Example 1 and the reduced graphene oxide according to Comparative Example 1 were evaluated and analyzed.

In this regard, FIGS. 7*a* and 7*b* are graphs showing the evaluation results of electrochemical properties of the reduced graphene oxides according to Example 1 and Comparative Example 1. A core-shell structured silicon-graphene (Si-QrGO) composite anode material was prepared using silicon (Si) and the reduced graphene oxide of Example 1, and a core-shell structured silicon-graphene (Si-HrGO) composite anode material was prepared using silicon (Si) and the reduced graphene oxide of Comparative Example 1. Then, the graphs were created on the basis of data of the electrochemical properties that were measured. The capacity and retention rate of secondary batteries can be determined through the evaluation of the electrochemical properties. In the case of using the Si-QrGO, the capacity retention rate was maintained up for 120 cycles at 1C. On the other hand, in the case of Si-HrGO, decay in retention rate appeared from the 50-th cycle, and the retention rate was reduced to about ½ times the capacity for the case of the Si-QrGO. In particular, as shown in FIGS. 7*a* and 7*b*, a similar behavior was exhibited until reaching about the 50-th cycle under the measurement conditions of 0.5C and 1C. However, in the case of the Si-HrGO using the reduced graphene oxide according to Comparative Example 1, the retention rate rapidly decreased over time after the 50-th cycle.

In addition, FIG. 8 is a graph showing the evaluation results of electrochemical properties for the cases of using the reduced graphene oxide according to Example 1 and an existing conductive material. The capacity retention rate and capacity for the cases of using the reduced graphene oxide according to Example 1, acetylene black which is an existing conductive material, and a sample that does not contain a conductive material are shown.

That is, the comparison results of rate characteristics and retention rates at 0.5 C for samples each containing a silicon active material and a binder in addition to a conductive material are shown, in which one of the sample contains the reduced graphene oxide as the conductive material, another sample contains acetylene black as the conductive material, and the other sample contains no conductive material. The retention rate was unchanged for early 50 cycles (see QrGO composite) in the case of the sample using the reduced graphene oxide (QrGO) according to Example 1 as the conductive material, while the retention rate tended to decrease over time in the case of the sample using acetylene black as the conductive material. From the results, it is concluded that as a secondary battery conductive material for connecting and maintaining silicon active material particles, the reduced graphene oxide according to Example 1 exhibits higher performance than acetylene black, which is an existing conductive material with a dot-like structure, because the reduced graphene oxide according to Example 1 has a two-dimensional structure and high electrical conductivity.

<Experimental Example 6> Shape Analysis of Ink or Paste Using Reduced Graphene Oxide In this experimental example, an ink or paste was prepared using the reduced graphene oxide according to Example 1, and its shape was analyzed.

In this regard, FIG. 9 is a photograph of a low-content ink prepared using the reduced graphene oxide according to Example 1. Referring to FIG. 9, it is confirmed that the low-content ink contains 0.1 wt % of the reduced graphene oxide as a solid phase with respect to the total weight of the ink.

FIGS. 10*a* to 10*f* are photographs of a high concentration paste prepared using the reduced graphene oxide according to Example 1. FIG. 10*a* shows a paste including a solvent in which the reduced graphene oxide according to Example 1 as a solid phase is contained in an amount of 1 wt %, FIG. 10*b* shows a paste including a solvent in which the reduced graphene oxide according to Example 1 as a solid phase is contained in an amount of 2 wt %, FIG. 10*c* shows a paste including a solvent in which the reduced graphene oxide according to Example 1 as a solid phase is contained in an amount of 3 wt %, FIG. 10*d* shows a paste including a solvent in which the reduced graphene oxide according to Example 1 as a solid phase is contained in an amount of 5 wt %, FIG. 10*e* shows a paste including a solvent in which the reduced graphene oxide according to Example 1 as a solid phase is contained in an amount of 7 wt %, and FIG. 10*f* shows a paste including a solvent in which the reduced graphene oxide according to Example 1 as a solid phase is contained in an amount of 12 wt %.

As shown in FIGS. 10$a$ to 10$e$, it was confirmed that when the content of the reduced graphene oxide as a solid phase was 1 wt %, 2 wt %, 3 wt %, 5 wt %, or 7 wt %, the sample was stable. However, it was confirmed that the sample having a solid content exceeding 10 wt % could not be regarded as a paste form.

In summary, the present disclosure is characterized in providing a two-dimensional crystalline reduced graphene oxide having a thickness of 1 to 5 nm, a high electrical conductivity of 100 to 1,000 S/cm, and a low specific surface area of 1 to 100 $m^2/g$ as measured by the BET method.

That is, since it is possible to reduce the specific surface area of the reduced graphene oxide manufactured by a modified Brody method, the features described above are meaningful in terms of improving electrode performance by reducing side reactions with an active material or a binder due to the reduced specific surface area.

Therefore, it is possible to obtain a reduced graphene oxide having a low specific surface area and high electrical conductivity through a simpler process, and in some cases, a reduced graphene oxide-silicon metal particle composite may be obtained in the form of a powder. Therefore, it is expected that it can be actively used in an anode for a secondary battery requiring high capacity, long lifespan, and high stable electrochemical properties.

The embodiments that have been described herein above are merely illustrative of the technical idea of the present disclosure, and thus various modifications, changes, alterations, substitutions, subtractions, and additions may also be made by those skilled in the art without departing from the gist of the present disclosure. The embodiments disclosed in the present disclosure are not intended to limit the scope of the present disclosure and the technical spirit of the present disclosure should not be construed as being limited to the embodiments. The protection scope of the present disclosure should be construed as defined in the following claims, and it is apparent that all technical ideas equivalent thereto fall within the scope of the present disclosure.

The invention claimed is:

1. A powdery two-dimensional crystalline reduced graphene oxide for a secondary battery, the reduced graphene oxide satisfying Relational Expressions 1 to 3 shown below:

$$1 \leq T_Q \leq 5 \quad \text{[Relational Expression 1]}$$

$$100 \leq E_Q \leq 1{,}000 \quad \text{[Relational Expression 2]}$$

$$1 \leq BET_Q \leq 100 \quad \text{[Relational Expression 3]}$$

wherein in Relational Expression 1, $T_Q$ represents the thickness (nm) of the reduced graphene oxide, in Relational Expression 2, $E_Q$ represents the electrical conductivity (S/cm) of the reduced graphene oxide, and in Relational Expression 3, $BET_Q$ represents the specific surface area ($m^2/g$) of the reduced graphene oxide.

2. The reduced graphene oxide of claim 1, wherein the reduced graphene oxide is obtained by synthesizing graphite oxide flakes from powdery graphite flakes, introducing the graphite oxide flakes into a solvent, performing exfoliation, dispersion, and reduction on the graphite oxide flakes through pH control, and perform spray drying.

3. The reduced graphene oxide of claim 1, wherein the reduced graphene oxide has a particle size in a range of from 1 to 10 μm.

4. The reduced graphene oxide of claim 1, wherein the reduced graphene oxide forms a low-content ink in which the crystalline reduced graphene oxide as a solid phase is dispersed in an amount in a range of 0.1 wt % or more and 0.9 wt % or less.

5. The reduced graphene oxide of claim 1, wherein the reduced graphene oxide forms a high concentration paste in which the crystalline reduced graphene oxide as a solid phase is dispersed in an amount in a range of 0.9 wt % or more and 10 wt % or less.

6. A method of preparing a reduced graphene oxide for secondary battery, the method comprising:

synthesizing graphite oxide flakes from powdery graphite flakes;

preparing a graphene oxide dispersion solution by introducing the graphite oxide flakes into a solvent, followed by exfoliation and dispersion through pH control;

preparing a reduced graphene oxide dispersion solution by reducing the graphene oxide dispersion solution; and preparing the reduced graphene oxide in powder form by spray-drying the reduced graphene oxide dispersion solution, wherein the reduced graphene oxide in powder form is a two-dimensional crystalline reduced graphene oxide satisfying Relational Expressions 1 to 3 shown below:

$$1 \leq T_Q \leq 5 \quad \text{[Relational Expression 1]}$$

$$100 \leq E_Q \leq 1{,}000 \quad \text{[Relational Expression 2]}$$

$$1 \leq BET_Q \leq 100 \quad \text{[Relational expression 3]}$$

wherein in Relational Expression 1, $T_Q$ represents the thickness (nm) of the reduced graphene oxide, in Relational Expression 2, $E_Q$ represents the electrical conductivity (S/cm) of the reduced graphene oxide, and in Relational Expression 3, $BET_Q$ represents the specific surface area ($m^2/g$) of the reduced graphene oxide.

7. An electrode comprising a current collector coated with the reduced graphene oxide of claim 1.

8. A secondary battery comprising the electrode of claim 7.

* * * * *